(12) United States Patent
Hartz et al.

(10) Patent No.: US 11,989,421 B2
(45) Date of Patent: May 21, 2024

(54) ADJUSTABLE DATA PROTECTION SCHEME USING ARTIFICIAL INTELLIGENCE

(71) Applicant: Micron Technology, Inc., Boise, ID (US)

(72) Inventors: Ezra E. Hartz, Meridian, ID (US); Nicolas Soberanes, Boise, ID (US); Joseph A. De La Cerda, Boise, ID (US); Benjamin Rivera, Boise, ID (US); Bruce J. Ford, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/406,997

(22) Filed: Aug. 19, 2021

(65) Prior Publication Data
US 2023/0058813 A1 Feb. 23, 2023

(51) Int. Cl.
*G06F 3/06* (2006.01)
*G06F 21/62* (2013.01)

(52) U.S. Cl.
CPC .......... *G06F 3/0619* (2013.01); *G06F 3/0629* (2013.01); *G06F 3/0679* (2013.01); *G06F 21/6218* (2013.01)

(58) Field of Classification Search
None
See application file for complete search history.

(56) References Cited

U.S. PATENT DOCUMENTS

| 8,572,411 | B2 | 10/2013 | Ginter et al. |
| 8,880,775 | B2 | 11/2014 | Stefanus et al. |
| 9,646,067 | B2 | 5/2017 | Abercrombie et al. |
| 10,043,035 | B2 | 8/2018 | LaFever et al. |
| 10,182,073 | B2 | 1/2019 | Redlich et al. |
| 10,976,962 | B2 | 4/2021 | Karumbunathan et al. |
| 11,042,432 | B1* | 6/2021 | Rao ............... G06F 11/3037 |
| 2013/0265825 | A1* | 10/2013 | Lassa ............... G06F 3/0655 |
| | | | 365/185.11 |
| 2014/0344216 | A1 | 11/2014 | Abercrombie et al. |
| 2015/0254134 | A1* | 9/2015 | Suzuki ............... G06F 3/064 |
| | | | 714/760 |
| 2016/0041870 | A1* | 2/2016 | Davis ............... H03M 13/3761 |
| | | | 714/773 |

(Continued)

FOREIGN PATENT DOCUMENTS

JP 4008937 11/2007

*Primary Examiner* — Edward J Dudek, Jr.
*Assistant Examiner* — Ralph A Verderamo, III
(74) *Attorney, Agent, or Firm* — Brooks, Cameron & Huebsch, PLLC (57) ABSTRACT

Apparatuses and methods can be related to implementing adjustable data protection schemes using artificial intelligence. Implementing adjustable data protection schemes can include receiving failure data for the plurality of memory devices and receiving an indication of a failure of a stripe of the plurality of memory devices based on the failure data. Based on failure data, and the indication of the failure of the stripe of the plurality of memory devices, a data protection scheme adjustment can be generated for the memory device. The data protection scheme adjustment can be received from the AI accelerator and can be implemented by a plurality of memory devices.

25 Claims, 7 Drawing Sheets

(56) References Cited

U.S. PATENT DOCUMENTS

| | | | |
|---|---|---|---|
| 2017/0126249 A1* | 5/2017 | Wu | H03M 13/353 |
| 2018/0034476 A1* | 2/2018 | Kayser | H03M 13/6393 |
| 2018/0076829 A1* | 3/2018 | Ueki | G06F 11/073 |
| 2018/0330238 A1 | 11/2018 | Luciw et al. | |
| 2019/0260784 A1 | 8/2019 | Stockdale et al. | |
| 2021/0073063 A1* | 3/2021 | Kale | G06F 11/3058 |
| 2021/0191811 A1* | 6/2021 | Galbi | G06F 11/108 |

* cited by examiner

ADJUSTABLE DATA PROTECTION SCHEME USING ARTIFICIAL INTELLIGENCE

TECHNICAL FIELD

The present disclosure relates generally to electronic memory systems and devices, and more particularly to apparatuses and methods associated with implementing an adjustable data protection scheme using artificial intelligence (AI).

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices. Various data protection schemes can be used to ensure data integrity within memory.

DETAILED DESCRIPTION

The present disclosure includes apparatuses and methods related to implementing an adjustable data protection scheme using artificial intelligence (AI). In various embodiments, the protection scheme includes a redundant array of independent NAND (RAIN) data protection scheme. RAIN utilizes parity protection schemes to protect data stored by the memory device. For example, RAIN schemes can utilize parity elements to recover data from the memory device.

Often times, RAIN is designed for the life of a memory system and may reduce performance of the memory system. RAIN can be optimized to not hinder performance of the memory system. However, optimizing RAIN to not hinder performance can cause a reduced life of the memory system. RAIN may be designed for particular fail rates. For defects that are not included in the particular fail rates, RAIN schemes may not recover data stored by the memory system.

Aspects of the present disclosure address the above and other deficiencies. RAIN performance may be relaxed for certain use cases where RAIN use is not needed and/or can be loosened. RAIN performance can be activated and/or tightened in cases where it is needed. RAIN may be needed in cases where block and/or word lines have a higher defectivity or in cases where end of life conditions exist. In a number of embodiments, the operation of RAIN of the memory system can be based on AI. For example, a utilization of the memory system can be analyzed and/or RAIN usage can be analyzed to generate adjustments to the RAIN scheme. Additionally, historical use data can be applied to adjust the RAIN setting(s) throughout the life of the memory system.

The use of RAIN and/or the memory system can be analyzed using artificial neural networks (ANNs), for example. As used herein, AI refers to the ability to improve a machine through "learning" such as by storing patterns and/or examples which can be utilized to take actions at a later time. Machine learning refers to a device's ability to learn from data provided as examples. Machine learning can be a subset of AI. As used herein, an ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. An ANN can utilize a number of inputs to generate a RAIN adjustment recommendation. The inputs can comprise, for example, failure data that correspond to a failure of stripe of a plurality of memory devices of a memory sub-system. The output can be the adjustment for the data protection scheme which can be the RAIN scheme.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 314 in FIG. 3. Analogous elements within a Figure may be referenced with a hyphen and extra numeral or letter. See, for example, elements 103-1, . . . , 103-N in FIG. 1. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
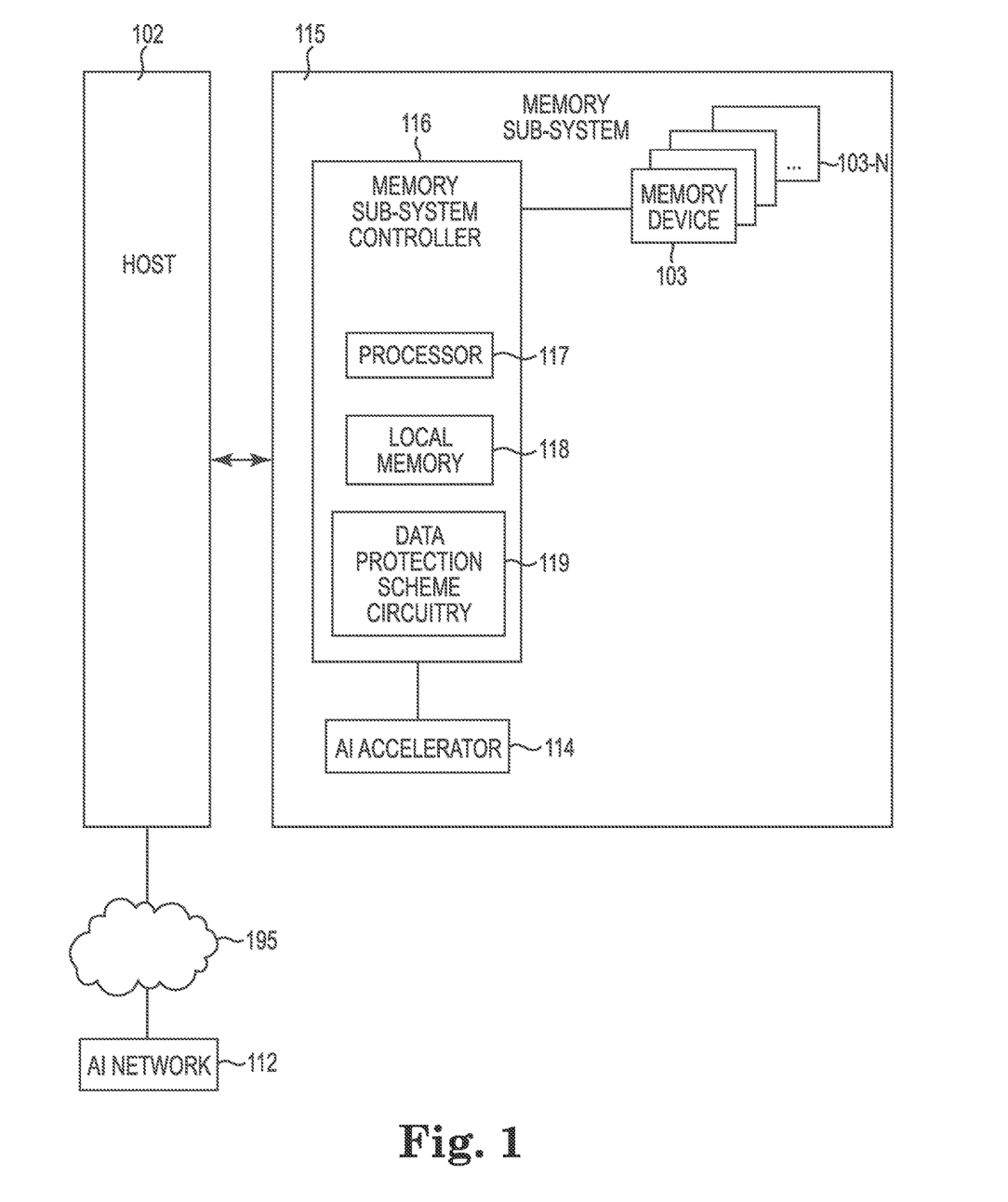
FIG. 1 is a block diagram of an apparatus in the form of a computing system including a memory sub-system in accordance with a number of embodiments of the present disclosure.

FIG. 1 is a block diagram of an apparatus in the form of a computing system 100 including a memory sub-system 115 in accordance with a number of embodiments of the present disclosure. As used herein, the memory system 115, the AI accelerator 114, and the memory device 103-1 to 103-N, and/or the host 102, for example, might also be separately considered an "apparatus."

The memory sub-system 115 can include media, such as volatile memory devices and/or non-volatile memory devices (e.g., memory device 103-1 to 103-N). The memory devices 103-1 to 103-N can be referred to as memory devices 103.

A memory sub-system 115 can be a storage device, a memory module, or a hybrid of a storage device and memory module. Examples of a storage device include a solid-state drive (SSD) such as NAND, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a desktop computer, laptop computer, network server, mobile device, a vehicle (e.g., automobile, airplane, drone, train, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 102 that is coupled to one or more memory sub-systems 115. In some embodiments, the host system 102 is coupled to different types of memory sub-systems 115. FIG. 1 illustrates an example of a host system 102 coupled to one memory sub-system 115. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 115, for example, to write data to the memory sub-system 115 and read data from the memory sub-system 115.

The host system 102 can be coupled to the memory sub-system 115 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 115. The host system 102 can further utilize an NVM Express (NVMe) interface to access components (e.g., memory devices 103) when the memory sub-system 115 is coupled with the host system 102 by the PCIe interface. The physical host interface can provide an interface for passing control, address, data, and other signals between the memory sub-system 115 and the host system 102. FIG. 1 illustrates a memory sub-system 115 as an example. In general, the host system 102 can access multiple memory sub-systems via a same communication connection, multiple separate communication connections, and/or a combination of communication connections.

The memory devices 103 can include any combination of the different types of non-volatile memory devices and/or volatile memory devices. The volatile memory devices can be, but are not limited to, random access memory (RAM), such as dynamic random access memory (DRAM) and synchronous dynamic random access memory (SDRAM).

Some examples of non-volatile memory devices (e.g., memory device 103) include not-AND (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 103 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 103 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the memory devices 103 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory devices 103 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-OR (NOR) flash memory, and electrically erasable programmable read-only memory (EEPROM).

A memory sub-system controller 116 (or controller 116 for simplicity) can communicate with the memory devices 103 to perform operations such as reading data, writing data, or erasing data at the memory devices 103 and other such operations. The memory sub-system controller 116 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 116 can be a microcontroller, special purpose logic circuitry (e.g., a field programmable gate array (FPGA), an application specific integrated circuit (ASIC), etc.), or other suitable processor.

The memory sub-system controller 116 can include a processing device such as a processor 117 configured to execute instructions stored in a local memory 118. In the illustrated example, the local memory 118 of the memory sub-system controller 116 includes an embedded memory configured to store instructions for performing various processes, operations, logic flows, and routines that control operation of the memory sub-system 115, including handling communications between the memory sub-system 115 and the host system 102.

In some embodiments, the local memory 118 can include memory registers storing memory pointers, fetched data, etc. The local memory 118 can also include read-only memory (ROM) for storing micro-code, for example. While the example memory sub-system 115 in FIG. 1 has been illustrated as including the memory sub-system controller 116, in another embodiment of the present disclosure, a memory sub-system 115 does not include a memory sub-system controller 116, and can instead rely upon external control (e.g., provided by an external host, or by a processor or controller separate from the memory sub-system).

In general, the memory sub-system controller 116 can receive commands or operations from the host system 102 and can convert the commands or operations into instructions or appropriate commands to achieve the desired access to the memory devices 103. The memory sub-system controller 116 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 103. The memory sub-system controller 116 can further include host interface circuitry to communicate with the host system 102 via the physical host interface. The host interface circuitry can convert the commands received from the host system into command instructions to access the memory devices 103 as well as convert responses associated with the memory devices 103 into information for the host system 102.

The memory sub-system 115 can also include additional circuitry or components that are not illustrated. In some embodiments, the memory sub-system 115 can include a cache or buffer (e.g., DRAM) and address circuitry (e.g., a row decoder and a column decoder) that can receive an address from the memory sub-system controller 116 and decode the address to access the memory devices 103.

In some embodiments, the memory devices 130 include a local media controller that operates in conjunction with memory sub-system controller 116 to execute operations on one or more memory cells of the memory devices 103. An external controller (e.g., memory sub-system controller 116) can externally manage the memory devices 103 (e.g., perform media management operations on the memory devices). In some embodiments, memory devices 103 are managed memory devices, which are raw memory devices combined with local controllers for media management within the same memory device package. An example of a managed memory device is a managed NAND (MNAND) device.

The memory sub-system controller 116 is coupled to the AI accelerator 114. The AI accelerator 114 can comprise hardware and/or firmware. The AI accelerator 114 can comprise various circuitry (e.g., hardware) such as one or more processing devices (e.g., microprocessors) such as a graphic processing unit (GPU), an application specific integrated circuit (ASIC), or a field-programmable gate array (FPGA), for example. The processors of the AI accelerator 114 can perform low-precision arithmetic operations. The AI accelerator 114 can be implemented using phase-change memory, for example. The processors of the AI accelerator 114 can be memory cells of a memory array. The memory cells can be used to perform matrix multiplication, for example. The memory cells can be configured to perform operations by controlling the resistance of the memory cells. The memory cells can be used to perform operations in parallel. In various examples, the AI accelerator 114 can implement processors that are separate from the memory cells of a memory array.

The AI accelerator 114 can be a deep learning accelerator (DLA), for example. The AI accelerator can be implemented on an edge of the memory system 115. For example, the AI accelerator 114 can be implemented external to the memory devices 103. The AI accelerator 114 can be coupled to an output path that couples the memory devices 103 to the I/O circuitry of the memory sub-system 115. The AI accelerator 114 can comprise feedback circuitry, for example.

The AI accelerator 114 can also be coupled to the memory sub-system controller 116. The memory sub-system controller 116 can control the AI accelerator 114. For example, the memory sub-system controller 116 can provide data to the AI accelerator 114 and can receive outputs from the AI accelerator. The input to the AI accelerator 114 can be provided as input to an ANN which is hosted by the AI accelerator 114. The memory sub-system controller 116 can also cause the output of the AI accelerator 114 and/or the ANN to be provided to the memory devices 103 and/or the host system 102.

The memory sub-system controller 116 can also include data protection scheme circuitry 119. The data protection scheme circuitry 119 can be circuitry to manage a RAIN scheme, for example. The data protection scheme circuitry 119 can be configured to manage the output of the AI accelerator 114 to data protection scheme adjustments to the memory devices 103. The data protection scheme circuitry 119 can also be configured to provide inputs to the AI accelerator 114. For instance, the data protection scheme circuitry 119 can provide temperature data, erase latency data, program latency data, and/or RBER data to the AI accelerator 114, among other data that can be provided to the AI accelerator 114. The data protection scheme circuitry 119 can also be configured to perform additional processing on the output of the AI accelerator 114 as needed.

The memory devices 103 can implement a data protection scheme. The data protection scheme circuitry 119 can manage the implementation of a data protection scheme by the memory devices 103. The data protection scheme (e.g., RAIN) can include striping (e.g., splitting) information so that different portions of the information are stored on different memory devices (e.g., memory devices 103). The portions of the more than one device that store the split data are collectively referred to as a stripe. In contrast, data protection schemes can also include mirroring, which can include storing duplicate copies of data on more than one device. As an example, write data can be striped across N−1 of N memory devices, where error information can be stored in an Nth memory device. Error information (e.g., parity data) can be calculated by the data protection scheme circuitry 119 and written to the Nth memory device (e.g., the parity element). The data protection scheme circuitry 119 can employ a flexible stripe length and a flexible ratio of parity elements to storage elements. The data protection scheme circuitry 119 can be configured to write and/or read data in stripes across the memory devices 103. For example, the memory sub-system controller 116 can be configured to read a stripe of data from a plurality of physical pages of the memory devices 103, where each of the plurality of physical pages of memory devices stores a respective plurality of codewords. The memory sub-system controller 116 can be configured to combine payload portions of more than one of the respective plurality of codewords from one of the plurality of physical pages of memory devices 103 to form a logical page of data. The logical page of data can then be transferred to the host system 102 (e.g., as a number of sectors).

The computing system 100 can be coupled to a cloud system via a network 195. The cloud system can include an AI network 112 such as an ANN. The host system 102 can couple the computing system 100 to the network 195. Although the examples described herein are given in the context of a RAIN scheme, the examples can also be applied to different data protection schemes.

Figure 2:
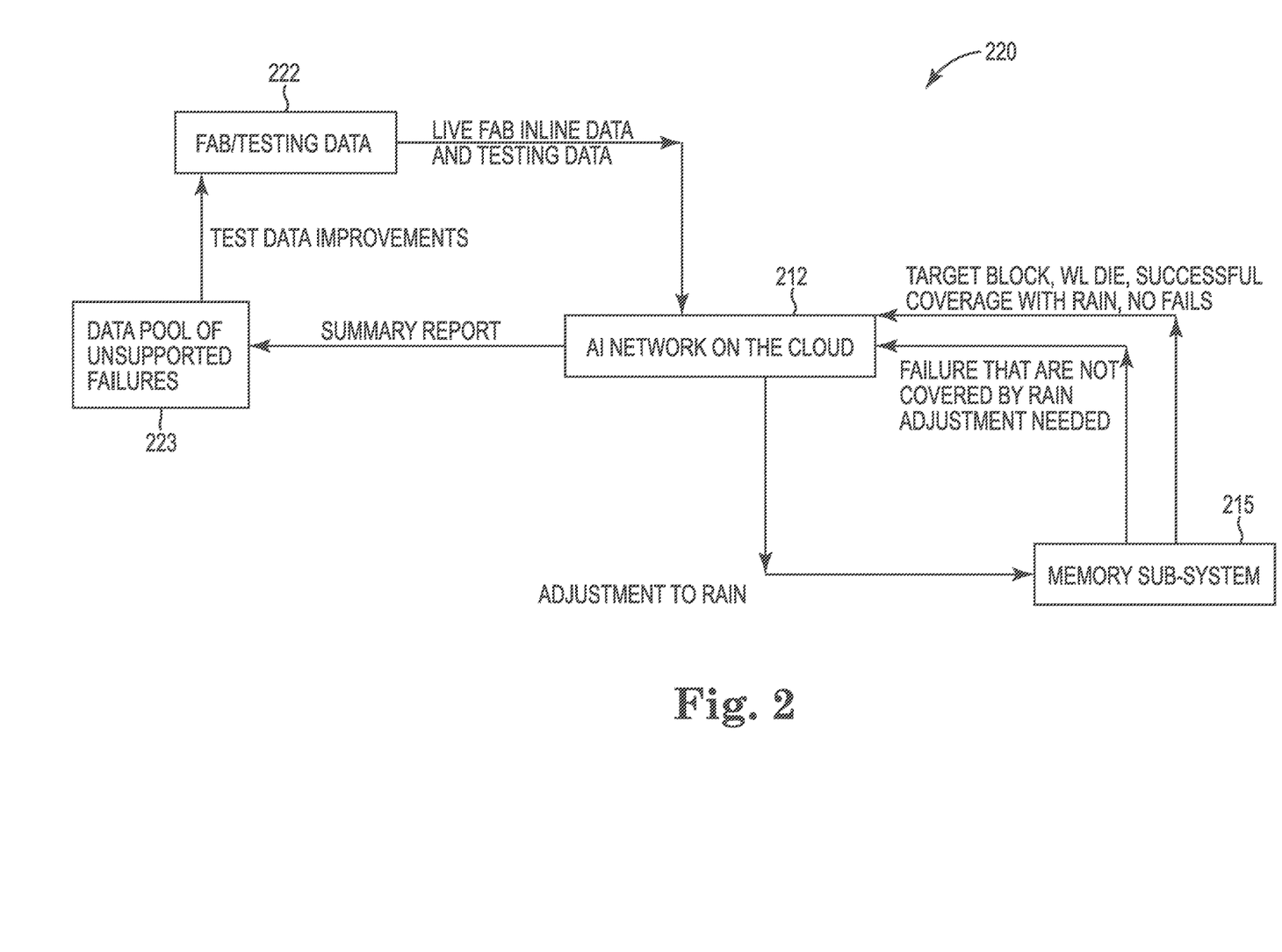
FIG. 2 illustrates a block diagram of RAIN adjustments via a cloud system in accordance with a number of embodiments of the present disclosure.

FIG. 2 illustrates a block diagram of RAIN adjustments via a cloud system 220 in accordance with a number of embodiments of the present disclosure. The cloud system 220 includes an AI network 212 and a memory sub-system 215. The cloud system 220 is coupled to memory devices storing a data pool 223 and/or a fabrication and testing data 222. As used herein, the data pool 223 is collection of instances of data.

The AI network 212 can be an ANN and can be hosted by an AI accelerator on the cloud system 220, for example. The AI network 212 can receive inputs from the memory sub-system 215 via a network such as network 195 from FIG. 1. The memory sub-system 215 providing the inputs can be a NAND memory sub-system. The memory sub-system 215 can comprise a controller shown in FIG. 1 as memory sub-system controller 116.

The inputs received by the AI network 212 can comprise data (e.g., failure data) describing failures or lack of failures experienced by strips, blocks and/or word lines of the memory sub-system 215. For example, the data can describe failures or lack of failures experienced by stirpes, blocks, and/or word lines of the memory devices of the memory sub-system 215. For example, prior RAIN adjustments implemented by the memory sub-system 215 may have targeted particular strips, blocks and/or word lines that represent a particular die of the memory sub-system 215. The data received by the AI network 212 can describe whether the particular strips, blocks and/or word lines continue to experience failures in view of the prior RAIN adjustments or if the particular blocks and/or word lines no longer experience failures in view of the prior RAIN adjustments. As described herein, failures experienced by the memory sub-system 215 include data loss by the memory sub-system 215. The data loss can be experienced while reading from the memory sub-system 215 and/or writing to the memory sub-system 215.

Data describing failures or lack of failures experienced by particular strips, blocks and/or word lines can include identifiers of dies of the memory sub-system 215. Die of the memory sub-system 215 can be identified utilizing fuse IDs. A fuse ID is an identifier that identifies a particular fuse and/or die of the memory sub-system 215. The fuse ID can be used to identify a die of a memory device, a stripe of a memory device, a block of a memory device, and/or a word line of the memory device, for example.

The inputs received by the AI network 212 can also comprise failures that are not correctable using RAIN adjustments. Failures that are not correctable using RAIN adjustments can include types of failures. Types of failures can include erase failures, program failures, and/or read failures. Inputs describing the failures that are not correctable using RAIN adjustments can also include failure data. Failure data can include program latency data, read latency data, erase latency data, and/or raw bit error rates (RBERs), among other possible data that can be used to describe the failures. Inputs describing the failures can further include data corresponding to stripes, blocks, and/or word lines of the memory sub-system 215 and/or fuse IDs that identify the stripes, blocks, and/or the word lines of the memory devices of the memory sub-system 215. Inputs describing failures can also include a count of bits that are not recoverable utilizing the RAIN adjustments.

Figure 3:
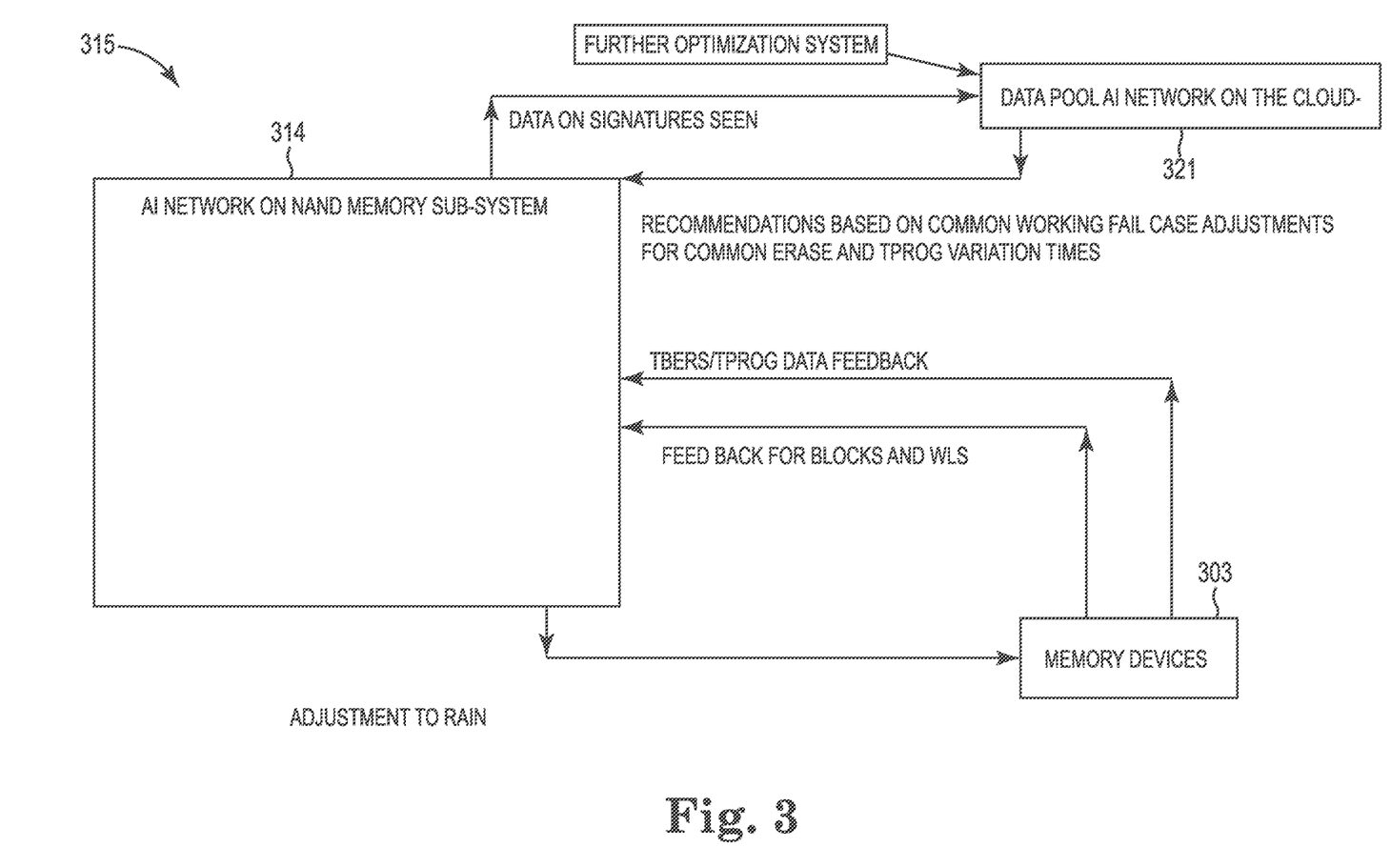
FIG. 3 illustrates a block diagram of a memory sub-system for implementing RAIN adjustments based on erase latencies and program latencies in accordance with a number of embodiments of the present disclosure.
Figure 4:
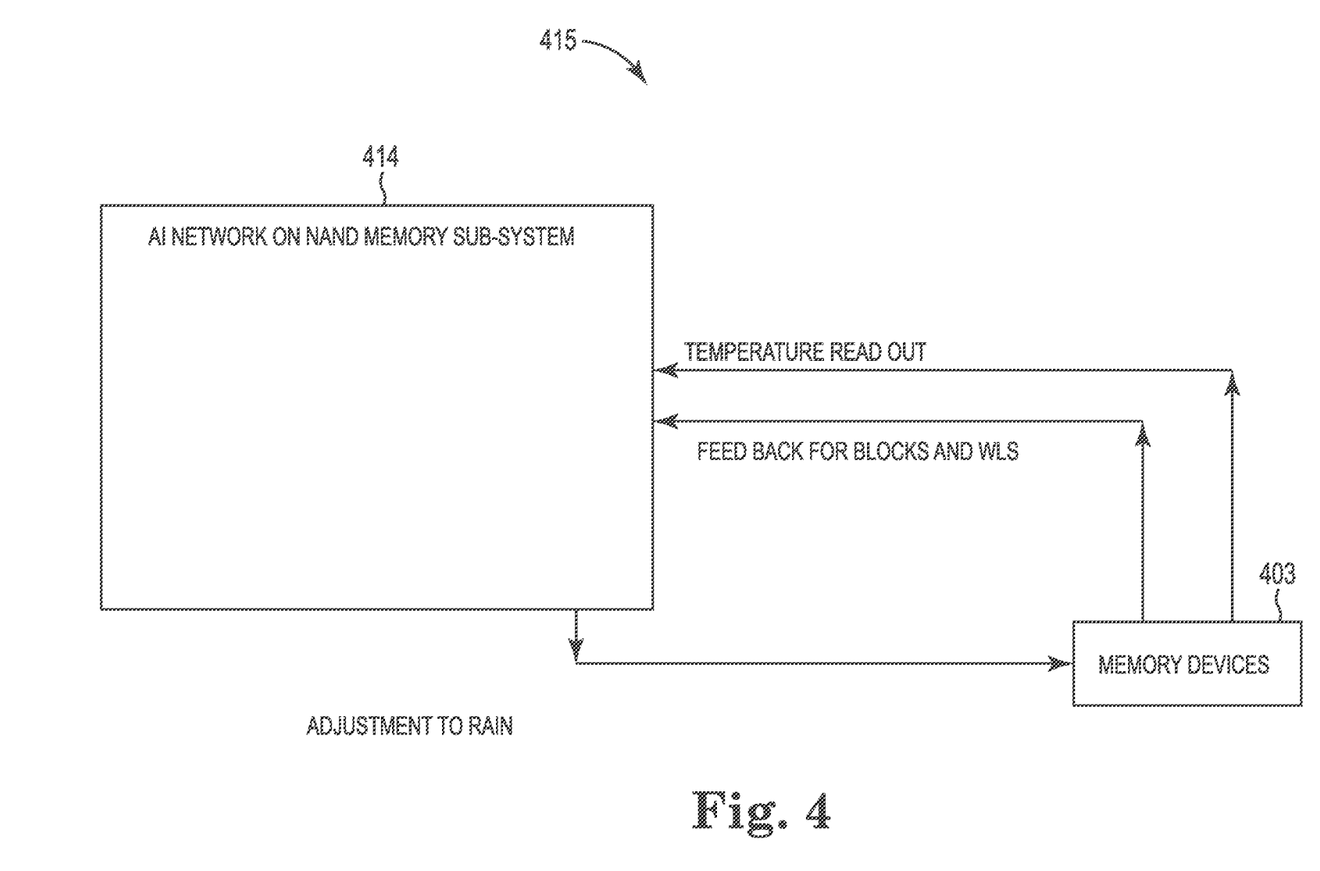
FIG. 4 illustrates a block diagram of a memory sub-system for implementing RAIN adjustments based on temperature data in accordance with a number of embodiments of the present disclosure.
Figure 5:
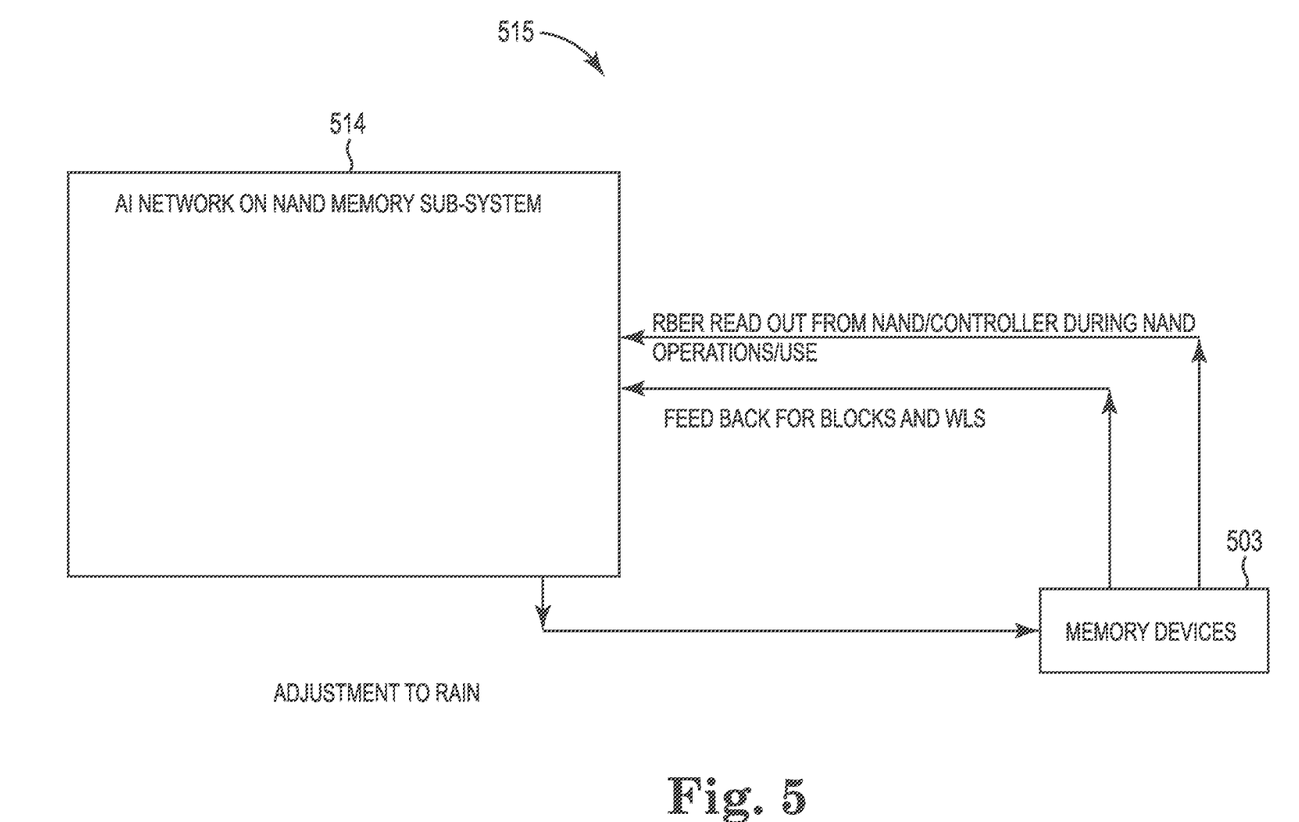
FIG. 5 illustrates a block diagram of a memory sub-system for implementing RAIN adjustments based on raw bit-error rates in accordance with a number of embodiments of the present disclosure.

The AI network 212 can utilize the inputs to generate RAIN adjustments. RAIN adjustments can relax RAIN performance for certain use cases where RAIN is not needed. RAIN adjustments can also tighten RAIN performance where RAIN is needed. RAIN may be needed if there are stripes, blocks, and/or word lines that are defective. The defectivity of the stripes, blocks, and/or word lines can be identified in a variety of ways. For example, the memory sub-system 215 can identify the defectivity of the stripes, blocks, and/or word lines as failures to decode data stored in the memory arrays of the memory sub-system 215. The memory sub-system 215 can determine whether RAIN adjustments previously implemented were successful in resolving the failures experienced by the stripes, blocks, and/or word lines. Failures that were not resolved by implementing RAIN adjustments can be identified and said identifications can be provided to the AI network 212 as input. FIGS. 3 to 5 provide for the monitoring of various attributes of the memory sub-system 215 that can be used to identify failures of the memory sub-system 215 and can be used to generate RAIN adjustments.

The AI network 212 can provide the RAIN adjustments to the memory sub-system 215. The memory sub-system 215 can implement the RAIN adjustments. The RAIN adjustments can include adjusting the ratio of parity elements to storage elements. For example, the ration of parity elements to storage elements can be changed from 1:7 (e.g., one parity element per seven storage elements) to 1:5 (e.g., one parity element per five storage elements). As used herein, storage elements can include elements of the memory sub-system 215 that is used to store codewords.

The RAIN adjustments can include refraining from utilizing stripes, blocks, and/or word lines of the memory device or initializing the use of stripes, blocks, and/or word lines of the memory device. RAIN adjustments can also include adjusting a level of memory cells of a particular stripe, block, and/or word lines. For instance, memory cells of a particular block can be configured to function as MLC where they were previously configured to function as SLC. The memory cells of the particular block can also be configured to function as SLC where they were previously configured to function as MLC.

The AI network 212 can also provide a summary report to a memory device that can store the summary report as a data pool 223 (e.g., pool of data) of unsupported failures. The summary report can identify failures that are not adjusted by the AI network 212. For example, the summary report can identify failures that are uncorrectable by RAIN adjustments and as such are described as unsupported failures.

The data pool 223 can store data of unsupported failures as provided by the summary report. The data of unsupported failures can be provided to a memory device that is utilized to store fabrication and/or testing data 222. The data of unsupported failures can be utilized in fabrication and/or testing to identify design changes to the memory sub-system 215 which can overcome the previously unsupported failures.

The fabrication and/or testing data 222 can also include live fabrication inline data and testing data which can be provided to the AI network 212. The live fabrication inline data and testing data can include data that contains inline data from parameter measurements of a memory sub-system 215 and testing trends to evaluate defectivity on stripes, blocks, and/or word lines. The AI network 212 can utilize the live fabrication inline data and testing data to generate RAIN adjustments for failures the AI network 212 has not experience previously. The AI network 212 can experience or not experience failures if the AI network 212 receives data corresponding to failures experienced by the memory sub-system 215.

FIG. 3 illustrates a block diagram of a memory sub-system 315 for implementing RAIN adjustments based on erase latencies and program latencies in accordance with a number of embodiments of the present disclosure. The memory sub-system 315 includes an AI network 314 and memory devices 303. The memory sub-system 315 can be coupled to a cloud system 321 via an interface of a computing system. The cloud system 321 can comprise an AI network such as an ANN configured to store a pool of data.

The AI network 314 can be implemented in the memory sub-system 315 as compared to the AI network 212 of FIG. 2 which is implemented in a cloud system. The AI network 314 can receive data from the memory devices 303. For example, the AI network 314 can receive erase latency data (TBERS) and program latency data (TPROG) from the memory devices 303.

The erase latency data can include a duration of time utilized to perform an erase operation on the memory devices 303. The program latency data can include a duration of time utilized to perform an erase operation on the memory devices 303. The erase latency data and the program latency data can be received from the memory devices 303. In various instances, failures experienced by the memory devices 303 or failures that are expected to be experienced by the memory devices 303 can be identified by analyzing the erase latency data and/or the program latency data.

The AI network 314 can also receive feedback for stripes, blocks, and/or word lines that have triggered tightening RAIN coverage if they are failing. The memory devices 303 can monitor the stripes, blocks, and/or word lines to determine if they are failing. Failures in the stripes, blocks, and/or word lines can indicate to the memory devices 303 that RAIN coverage needs to be tightened. For example, the RAIN coverage can be tightened by changing the ratio of parity elements to storage elements. In various examples, the memory devices 303 can also provide cycling counts corresponding to the erase latency data, the program latency data, the memory devices 303, and/or the failures experienced by the stripes, blocks, and/or word lines. The RAIN adjustments can also be generated in view of the cycling counts.

The AI network 314 can generate a RAIN adjustment based on the feedback form the stripes, blocks, and/or word lines, the erase latency data, and/or the program latency data. In various instances, the erase latency and/or the program latency provided via the erase latency data and the program latency data can constitute a signature corresponding to the failures experienced by the stripes, blocks, and/or word lines of the memory devices 303. The signatures provided by the memory devices 303 can be compared to previously experienced signatures that can be stored in a table, for example. The previously experienced signatures can comprise a range of fail latencies for erase operations and program operations. The signatures can also be referred to as fail signatures. The fail signatures can be associated with RAIN adjustments that tighten coverage. The signatures (e.g., erase time and program time) received from the memory devices 303 can be compared to the signatures stored by the AI network 314 to generate RAIN adjustments. The RAIN adjustments can be provided to the memory devices 303.

In various examples, the feedback for the stripes, blocks and/or word lines can be utilized by the AI network 314 to determine whether additional RAIN adjustments are needed. For example, based on a cycle count and/or raw bit-error rates (RBER) experiences after RAIN adjustments have been implemented by the memory devices 303, the AI network 314 can generate additional RAIN adjustments. For example, if particular stripes, blocks, and/or word lines of the memory devices 303 continue to experience failures as described by the erase latency data, the program latency data, the cycle counts, and/or the RBER, then the AI network 314 can generate additional RAIN adjustments. Similarly, additional stripes, blocks, and/or word lines that demonstrate similar signatures as previous signatures identified as fail signatures can have RAIN adjustments implemented thereon even if no failures are associated with said stripes, blocks, and/or word lines given the high likely hood of imminent failures.

The AI network 314 can also provide data to a cloud system 321, where the data describes signatures seen by the AI network 314 and data on the RAIN adjustments implemented to correct the failures. The cloud system 321 can perform further optimization utilizing the data received from the AI network 314. The cloud system 321 can provide recommendations for signatures that the AI network 314 has not encounter to provide better guidance.

FIG. 4 illustrates a block diagram of a memory sub-system 415 for implementing RAIN adjustments based on temperature data in accordance with a number of embodiments of the present disclosure. The memory sub-system 415 includes an AI network 414 and memory devices 403.

The memory devices 403 can provide temperature data to the AI network 414. The temperature data can include temperature read outs from the memory devices 403 during operations of the memory devices 403. The memory devices 403 can also provide feedback for failures experienced by the stripes, blocks, and/or word lines or the lack of failures experienced by the stripes, blocks, and/or word lines where the stripes, blocks, and/or word lines were programmed with tightened RAIN coverage during cross temperature use.

The AI network 414 can utilize the temperature data and the feedback to generate RAIN adjustments. Temperature changes seen on the memory devices 403 can be monitored. Responsive to monitoring the temperature changes, the AI network 414 can trigger changes to RAIN coverage, if they are needed. In many instances, changes in temperature can be correlated with failures experienced by the memory devices 403 or future failures that the memory device 403 may experience without additional RAIN coverage.

In various instances, the memory devices 403 can provide a RBER. The AI network 414 can monitor the RBER to determine whether it increases during temperature changes to create a cross temperature limits. The AI network 414 can generate RAIN adjustments based on the cross temperature limits. The cross temperature limits can be a threshold that can be used to determine whether to implement RAIN adjustments and/or what types of RAIN adjustments to implement.

In various examples, the RAIN adjustments can be generated to prevent (e.g., margin) the failing of the memory devices 403. RAIN adjustments can be implemented prior to the memory devices 403 experiencing failures. For example, RAIN adjustments can be implemented at a first temperature of the memory device 403 even though failures are not expected until a second temperature is reached. The difference between the second temperature and the first temperature can be a margin that is used to prevent the memory device 403 from experiencing failures.

FIG. 5 illustrates a block diagram of a memory sub-system 515 for implementing RAIN adjustments based on RBERs in accordance with a number of embodiments of the present disclosure. The memory sub-system 515 can include an AI network 514 coupled to memory devices 503 directly or via a controller as shown in FIG. 1.

The memory devices 503 can provide a RBER to the AI network 514. The RBER can be a readout form the memory device 503 or a controller of the memory device 503 and/or the controller of the memory sub-system 515. The RBER can be a readout generated during operation of the memory devices 503 or a use of the memory devices 503. The memory devices 503 can also provide feedback for stripes, blocks, and/or word lines of the memory device 503. The feedback can be provided to the AI network 514. The feedback can provide data regarding the stripes, blocks, and/or word lines that were programmed with tightened RAIN coverage due to high life cycle. The feedback can also describe the margin between failing and passing conditions of the memory device 503. Passing conditions describe the ability to decode data read from the memory device 503.

The AI network 514 can receive the RBER and the feedback. The AI network 514 can monitor the RBER to determine whether the RBER is increasing. A RBER increase seen during cycling can be monitored to measure an average margin to fail limit. The RAIN adjustment calculation can maintain a margin from the failing level to extend the life of memory devices 503 or portions (e.g., stripes, blocks, and/or word lines) of the memory devices 503.

In various examples, the RBER can be an indication of the cycles experienced by the memory devices 503. The memory devices 503 is expected to have a greater RBER as the memory devices 503 ages. As such, RAIN coverage may be tightened as the memory devices 503 ages to reduce the RBER and the associated failing conditions of the memory devices 503.

In various examples, the memory devices 503 can provide a quantity of cycles of the memory device 503, blocks of the memory device 503, and/or word lines of the memory device 503. The AI network 514 can generate the RAIN adjustments based on the quantity of cycles and/or the RBER.

Figure 6:
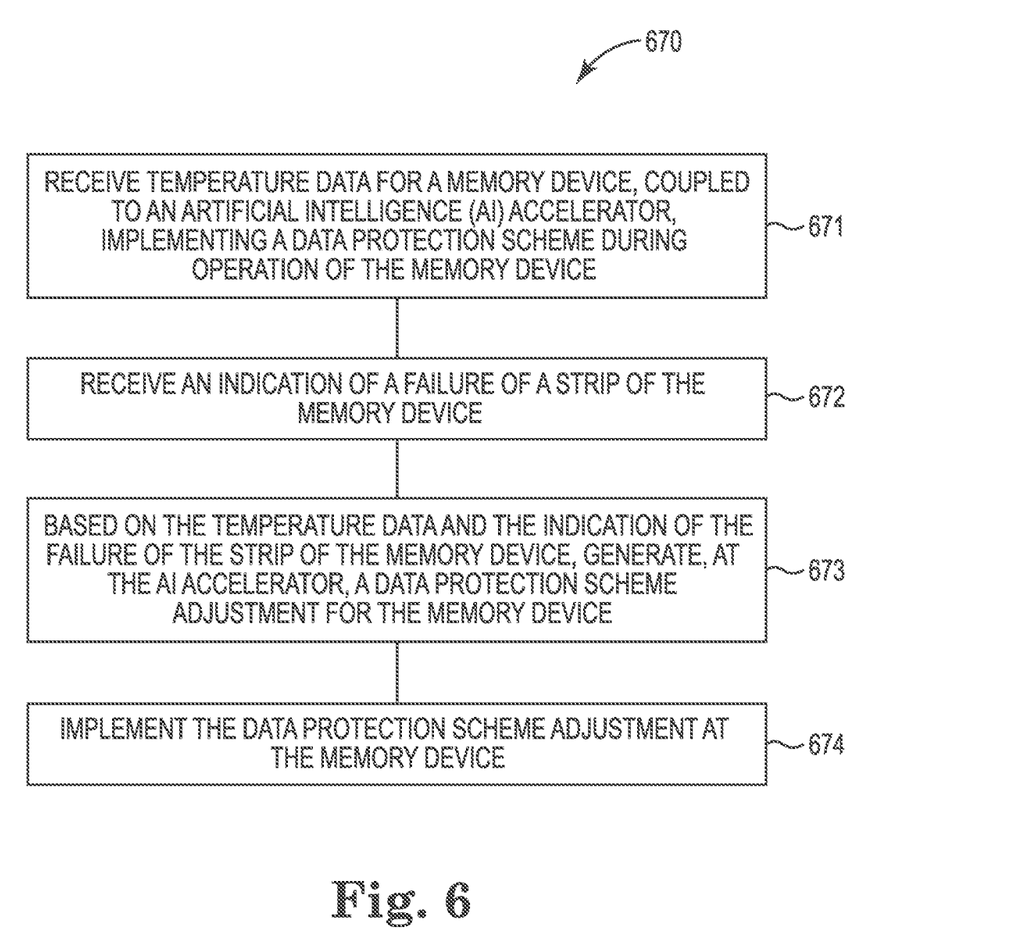
FIG. 6 illustrates an example flow diagram of a method for implementing data protection schemes in accordance with a number of embodiments of the present disclosure.

FIG. 6 illustrates an example flow diagram of a method 670 for implementing data protection schemes in accordance with a number of embodiments of the present disclosure.

The method 670 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 670 is performed by the control circuitry (e.g., controller) 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 671, temperature data for a memory device coupled to an artificial intelligence (AI) accelerator can be received. At block 672, the memory device can implement a data protection scheme during operation. The AI accelerator and the memory device can be internal to a memory sub-system.

At block 673, an indication of a failure of a stripe of the memory device can be received. For example, the memory device can provide the indication to a controller of the memory sub-system. The memory sub-system can relay the indication to the AI accelerator. At block 674 and based on the temperature data and the indication of the failure of the stripe of the memory device, a data protection scheme adjustment for the memory device can be generated at the AI accelerator. The AI accelerator can provide the data protection scheme adjustment to the memory device. At block 675, the memory device can implement the data protection scheme adjustment.

The AI accelerator can determine whether the temperature data indicates that a temperature, corresponding to the temperature data, is greater than a threshold temperature of the memory device. A temperature that is greater than a threshold can indicate that data protection scheme adjustments are needed to avoid or mitigate failures of the memory device.

A plurality of RBERs experienced by the memory device at a time prior temperature data is generated can be received. The AI accelerator can generate the threshold temperature based on the plurality of RBERs and the prior temperature data.

A different indication of a lack of failures of the memory device can also be received. Based on the temperature data and the different indication of the lack of failures of the memory device, the AI accelerator can generate a different data protection scheme adjustment for the memory device. The data protection scheme adjustment can tighten data protection scheme coverage in the memory device and the different data protection scheme adjustment can loosen data protection scheme coverage in the memory device.

In various examples, a plurality of memory devices can implement a data protection scheme. An AI accelerator coupled to the plurality of memory devices can receive failure data for the plurality of memory devices. The AI accelerator can also receive an indication of a failure of a stripe of the plurality of memory devices based on the failure data. For example, the failure data can cause the plurality of memory devices to indicate that a failure has occurred in the stripe of the memory devices or that the failure is imminent. Based on the failure data, and the indication of the failure of the stripe of the plurality of memory devices, a data protection scheme adjustment can be generated for the plurality of memory devices. The plurality of memory devices can receive the data protection scheme adjustment from the AI accelerator and can implement the data protection scheme adjustment.

In various instances, the AI accelerator can receive the indication of the failure of a block of the plurality of memory devices and the indication of the failure of a word line of the memory device. The AI accelerator can also receive the indication of the failure of a stripe of the plurality of memory devices. The plurality of memory devices configured to implement the data protection scheme adjustment are further configured to adjust a ratio of parity elements to storage elements, configured to refrain from utilizing blocks of the plurality of memory devices, and/or configured to adjust a quantity of bits that each of a plurality of memory cell can store. Adjusting the quantity of bits that each of the plurality of memory cells can store can include adjusting memory cells from a single-level cell (SLC) to a multi-level cell (MLC) or from a multi-level cell (MLC) to a single-level cell (SLC). Data protection scheme adjustments can be selected by comparing the failure data to a plurality of signatures comprising failure data using a table. For instance, the data protection scheme adjustment can be selected by comparing the erase latency data and the program latency data to a plurality of signatures comprising erase latency data and program latency data pairs using a table. In various examples, a signature is comprised of erase latency data and program latency data. A signature can also be comprised of erase latency data or program latency data. The signature can further comprise the failure data.

The AI accelerator can generate additional data protection scheme adjustments for a plurality of blocks of the memory device based on cycle counts of the plurality of blocks of the memory device and based on RBERs of the plurality of blocks of the memory device. The plurality of blocks can have erase latencies and program latencies that are similar to an erase latency corresponding to the failure data and a program latency corresponding to the failure data.

The AI accelerator can further provide data corresponding to the failure data to a cloud system to be added to a pool of failures. The AI accelerator can receive additional data protection scheme adjustments corresponding to the pool of failures from the cloud system. The AI accelerator can also generate data protection scheme adjustments for failures that have not been experienced by the plurality of memory devices by selecting the data protection scheme adjustments from the additional data protection scheme adjustments. The failure data can include latency data, read latency data, erase latency data, and raw bit error rates (RBERs).

An apparatus for implementing AI data protection scheme can receive, at an AI accelerator, a RBER for the memory device and during operation of the memory device. Data corresponding to a passing or failing condition of the memory device can also be received. Based on the RBER and the data, a data protection scheme adjustment can be generated for the memory device to extend a life of the memory device. The memory device can implement the data protection scheme adjustment.

Data corresponding to a passing or failing condition of a stripe, block and/or a word line of the memory device can be received by the AI accelerator. The AI accelerator can also generate the data protection scheme adjustment for a stripe, block and/or a word line of the memory device. The AI accelerator can also generate an average margin to the failing condition utilizing the data and the RBER. The AI accelerator can also generate the data protection scheme adjustment based on the average margin and the failing condition.

A system implementing a protection scheme can comprise an AI accelerator implement in a cloud system and a plurality of memory devices implementing the data protection scheme. The AI accelerator can be configured to receive fabrication data and testing data, receive state data describing a state of the plurality of memory devices, and receive fuse ID corresponding to at least one of the plurality of memory devices. Responsive to receipt of the fabrication data, the testing data, and the state data, a data protection scheme adjustment can be generated for memory cells corresponding to the fuse ID. The plurality of memory devices can be configured to implement the data protection scheme adjustment for the memory cells corresponding to the fuse ID.

The AI accelerator can generate a summary report for failures of a stripe of the plurality of memory devices described in the state data that are not adjusted by the data protection scheme adjustment. The summary report can include the state data for inclusion in a pool of unsupported failures. The pool of unsupported failures can be utilized for fabricating and testing NAND memory devices. The data protection scheme can be a redundant array of independent NAND (RAIN) scheme.

Figure 7:
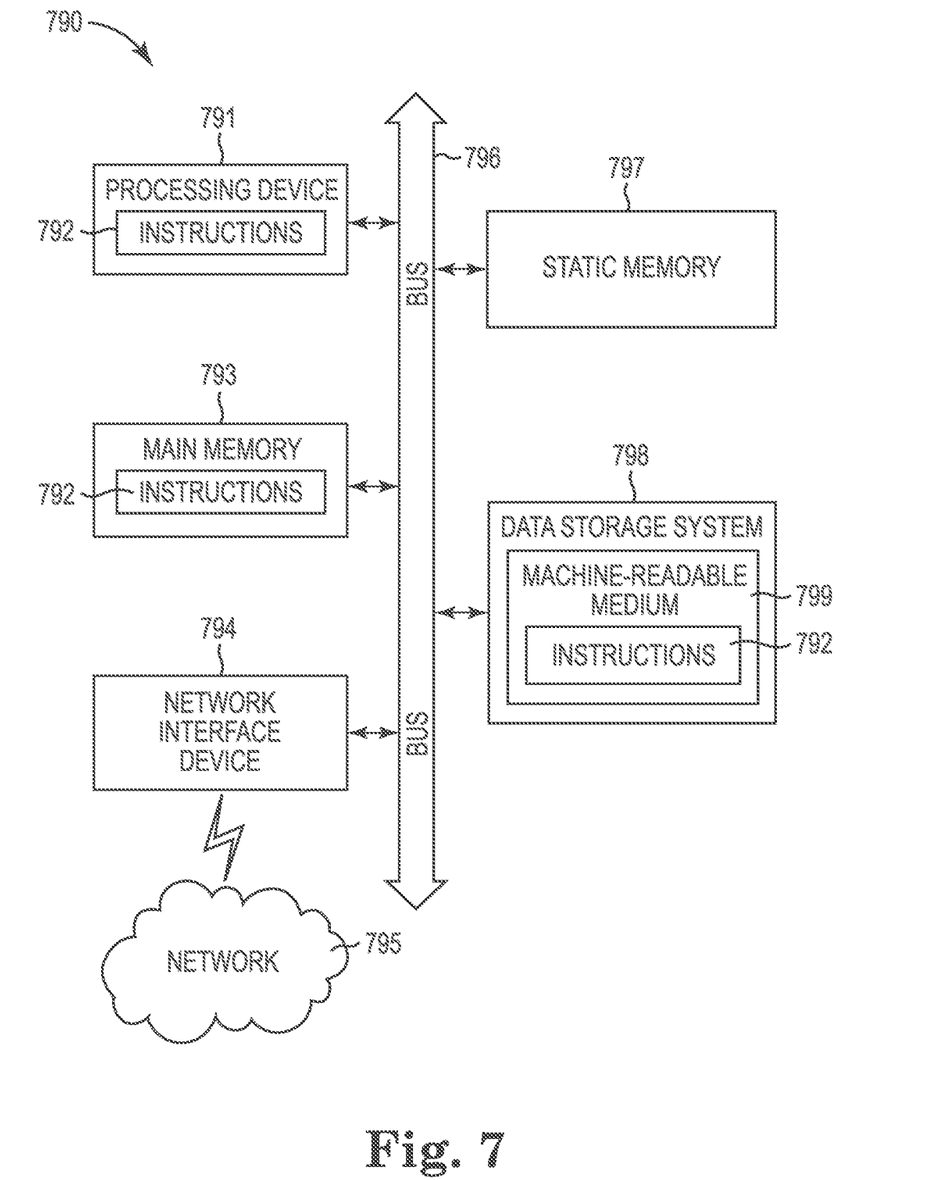
FIG. 7 illustrates an example machine of a computer system within which a set of instructions, for causing the machine to perform various methodologies discussed herein, can be executed.

FIG. 7 illustrates an example machine of a computer system 790 within which a set of instructions, for causing the machine to perform various methodologies discussed herein, can be executed. In various embodiments, the computer system 790 can correspond to a system (e.g., the computing system 100 of FIG. 1) that includes, is coupled to, or utilizes a memory sub-system (e.g., the memory sub-system 115 of FIG. 1) or can be used to perform the operations of a controller (e.g., the controller circuitry 116 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 790 includes a processing device 791, a main memory 793 (e.g., read-only memory (ROM), flash memory, dynamic random access memory (DRAM) such as synchronous DRAM (SDRAM) or Rambus DRAM (RDRAM), etc.), a static memory 797 (e.g., flash memory, static random access memory (SRAM), etc.), and a data storage system 798, which communicate with each other via a bus 796.

Processing device 791 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 791 can also be one or more special-purpose processing devices such as an application specific integrated circuit (ASIC), a field programmable gate array (FPGA), a digital signal processor (DSP), network processor, or the like. The processing device 791 is configured to execute instructions 792 for performing the operations and steps discussed herein. The computer system 790 can further include a network interface device 794 to communicate over the network 795.

The data storage system 798 can include a machine-readable storage medium 799 (also known as a computer-readable medium) on which is stored one or more sets of instructions 792 or software embodying any one or more of the methodologies or functions described herein. The instructions 792 can also reside, completely or at least partially, within the main memory 793 and/or within the processing device 791 during execution thereof by the computer system 790, the main memory 793 and the processing device 791 also constituting machine-readable storage media.

In one embodiment, the instructions 792 include instructions to implement functionality corresponding to the host 102 and/or the memory sub-system 115 of FIG. 1. While the machine-readable storage medium 799 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
a plurality of memory devices implementing a data protection scheme;
an artificial intelligence (AI) accelerator coupled to the plurality of memory devices;
wherein the AI accelerator is configured to:
receive failure data for the plurality of memory devices;
receive an indication of a failure of a stripe of the plurality of memory devices based on the failure data;
based on failure data, and the indication of the failure of the stripe of the plurality of memory devices, generate a data protection scheme adjustment for the plurality of memory devices;
wherein the plurality of memory devices are configured to:
receive the data protection scheme adjustment from the AI accelerator; and
implement the data protection scheme adjustment; and
generate additional data protection scheme adjustments for a plurality of blocks of the plurality of memory devices based on cycle counts of the plurality of blocks of the plurality of memory devices and based on raw bit-error rates of the plurality of blocks of the plurality of memory devices,
wherein the plurality of blocks have erase latencies and program latencies that are similar to an erase latency corresponding to the failure data and a program latency corresponding to the failure data.

2. The apparatus of claim 1, wherein the AI accelerator is further configured to receive the indication of the failure of a block of the plurality of memory devices.

3. The apparatus of claim 1, wherein the AI accelerator is further configured to receive the indication of the failure of a word line of the plurality of memory devices.

4. The apparatus of claim 1, wherein the plurality of memory devices configured to implement the data protection scheme adjustment are further configured to adjust a ratio of parity elements to storage elements.

5. The apparatus of claim 1, wherein the plurality of memory devices configured to implement the data protection scheme adjustment are further configured to refrain from utilizing blocks of the plurality of memory devices.

6. The apparatus of claim 1, wherein the plurality of memory devices configured to implement the data protection scheme adjustment are further configured to adjust a quantity of bits that each of a plurality of memory cells can store.

7. The apparatus of claim 6, wherein the plurality of memory devices are configured to adjust the quantity of bit that each of the plurality of memory cells can store from a single-level cell (SLC) to a multi-level cell (MLC).

8. The apparatus of claim 6, wherein the plurality of memory devices are configured to adjust the level of the plurality of memory cells from a multi-level cell (MLC) to a single-level cell (SLC).

9. The apparatus of claim 1, wherein the AI accelerator is further configured to generate the data protection scheme adjustment utilizing an artificial neural network (ANN).

10. The apparatus of claim 1, wherein the AI accelerator configured to generate the data protection scheme adjustment is further configured to select the data protection scheme adjustment by comparing the failure data to a plurality of signatures comprising failure data using a table.

11. The apparatus of claim 1, wherein the AI accelerator is further configured to:
provide data corresponding to the failure data to a cloud system to be added to a pool of failures; and
receive additional data protection scheme adjustments corresponding to the pool of failures from the cloud system;
generate data protection scheme adjustments for failures that have not been experienced by the plurality of memory devices by selecting the data protection scheme adjustments from the additional data protection scheme adjustments.

12. The apparatus of claim 1, wherein the failure data includes latency data, read latency data, erase latency data, and raw bit error rates (RBERs).

13. A method, comprising:
receiving a plurality of raw bit-error rates (RBERs) experienced by a memory device at a time prior to when a temperature data is generated;
receiving temperature data for a memory device, coupled to an artificial intelligence (AI) accelerator, implementing a data protection scheme during operation of the memory device;
generating, at the AI accelerator, a threshold temperature based on the plurality of RBERs and the temperature data;
receiving an indication of a failure of a stripe of the memory device;
determining, at the AI accelerator, whether the temperature data indicates that a temperature, corresponding to the temperature data, is greater than the threshold temperature of the memory device;
based on the temperature data being greater than the threshold temperature and the indication of the failure of the stripe of the memory device, generating, at the AI accelerator, a data protection scheme adjustment for the memory device; and
implementing the data protection scheme adjustment at the memory device.

14. The method of claim 13, further comprising:
receiving a different indication of a lack of failures of the memory device; and
based on the temperature data and the different indication of the lack of failures of the memory device, generating, at the artificial intelligence (AI) accelerator, a different data protection scheme adjustment for the memory device.

15. The method of claim 14, wherein the data protection scheme adjustment tightens data protection scheme coverage in the memory device and the different data protection scheme adjustment loosens redundant array of independent NAND (RAINS coverage in the memory device.

16. An apparatus, comprising:
a memory device implementing a data protection scheme;
an artificial intelligence (AI) accelerator coupled to the memory device;
wherein the AI accelerator is configured to:
receive a raw bit-error rate (RBER) for the memory device and during operation of the memory device;
receive data corresponding to a passing or failing condition of the memory device;
based on the RBER and the data, generate a data protection scheme adjustment for the memory device to extend a life of the memory device;
wherein the memory device is configured to implement the data protection scheme adjustment;
provide data corresponding to the failure data to a cloud system to be added to a pool of failures;
receive additional data protection scheme adjustments corresponding to the pool of failures from the cloud system; and
generate data protection scheme adjustments for failures that have not been experienced by the plurality of memory devices by selecting the data protection scheme adjustments from the additional data protection scheme adjustments.

17. The apparatus of claim 16, wherein the AI accelerator is configured to receive the data corresponding to a passing or failing condition of a block or a word line of the memory device.

18. The apparatus of claim 16, wherein the AI accelerator is configured to generate the data protection scheme adjustment for a block or word line of the memory device.

19. The apparatus of claim 16, wherein the AI accelerator is further configured to:
generate an average margin to the failing condition utilizing the data and the RBER; and
generate the data protection scheme adjustment based on the average margin and the failing condition.

20. A system, comprising:
an AI accelerator implement in a cloud system;
a plurality of memory devices implementing a data protection scheme;
wherein the AI accelerator is configured to:
receive fabrication data and testing data;
receive state data describing a state of the plurality of memory devices;
receive fuse identification (ID) corresponding to at least one of the plurality of memory devices;
responsive to receipt of the fabrication data, the testing data, and the state data, generating a data protection scheme adjustment for memory cells corresponding to the fuse ID; and
wherein the plurality of memory devices are configured to implement the data protection scheme adjustment for the memory cells corresponding to the fuse ID.

21. The system of claim 20, wherein the AI accelerator is further configured to generate a summary report for failures of a stripe of the plurality of memory devices described in the state data that are not adjusted by the data protection scheme adjustment.

22. The system of claim 21, wherein the AI accelerator is further configured to provide the summary report including the state data for including in a pool of unsupported failures.

23. The system of claim 22, wherein the pool of unsupported failures is utilized for fabricating and testing NAND memory devices.

24. The system of claim 20, wherein the data protection scheme is a redundant array of independent NAND (RAIN).

25. An apparatus comprising:
- a plurality of memory devices implementing a data protection scheme;
- an artificial intelligence (AI) accelerator coupled to the plurality of memory devices;
- wherein the AI accelerator is configured to:
  - receive failure data for the plurality of memory devices, wherein the failure data includes latency data, read latency data, erase latency data, and raw bit error rates (RBERs);
  - receive an indication of a failure of a stripe of the plurality of memory devices based on the failure data; and
  - based on failure data, and the indication of the failure of the stripe of the plurality of memory devices, generate a data protection scheme adjustment for the plurality of memory devices;
- wherein the plurality of memory devices are configured to:
  - receive the data protection scheme adjustment from the AI accelerator; and
  - implement the data protection scheme adjustment.

* * * * *